May 19, 1931.  C. F. STREIT ET AL  1,805,856
SCRAP REMOVING DEVICE FOR WOODWORKING MACHINERY
Filed Feb. 15, 1929  2 Sheets-Sheet 1
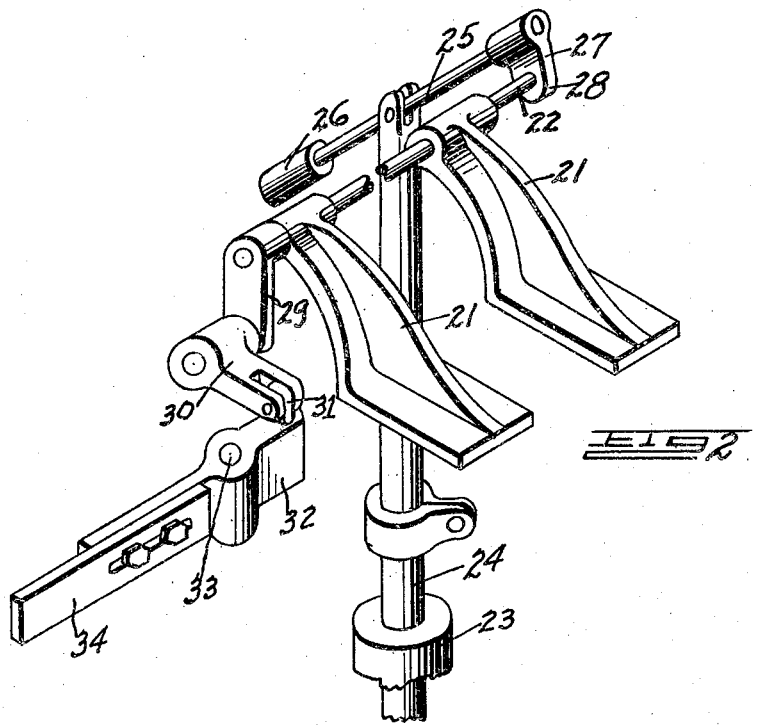
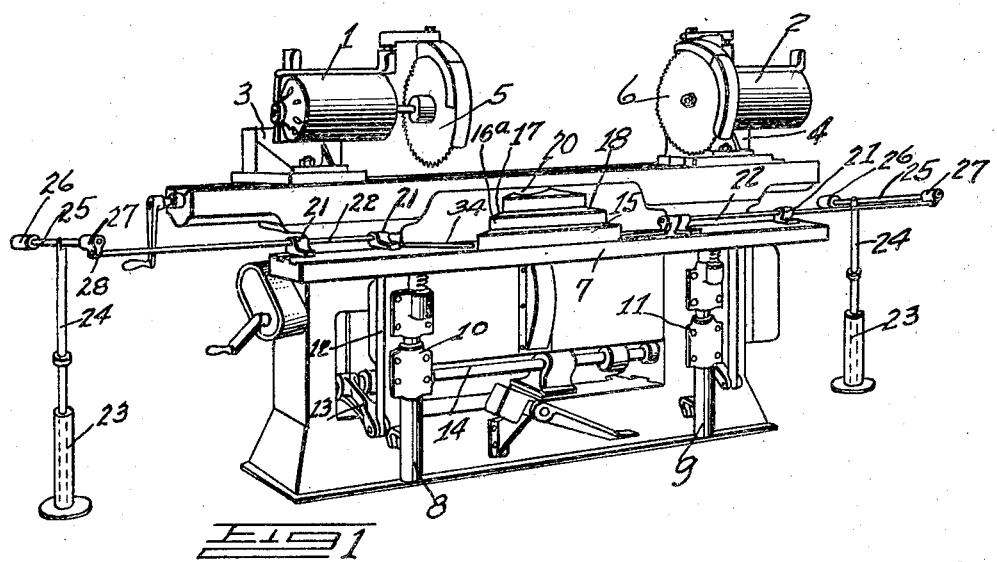
INVENTORS.
Carl F. Streit
George J. Kuhnle
BY
Allen & Allen
ATTORNEYS May 19, 1931. C. F. STREIT ET AL 1,805,856
SCRAP REMOVING DEVICE FOR WOODWORKING MACHINERY
Filed Feb. 15, 1929 2 Sheets-Sheet 2
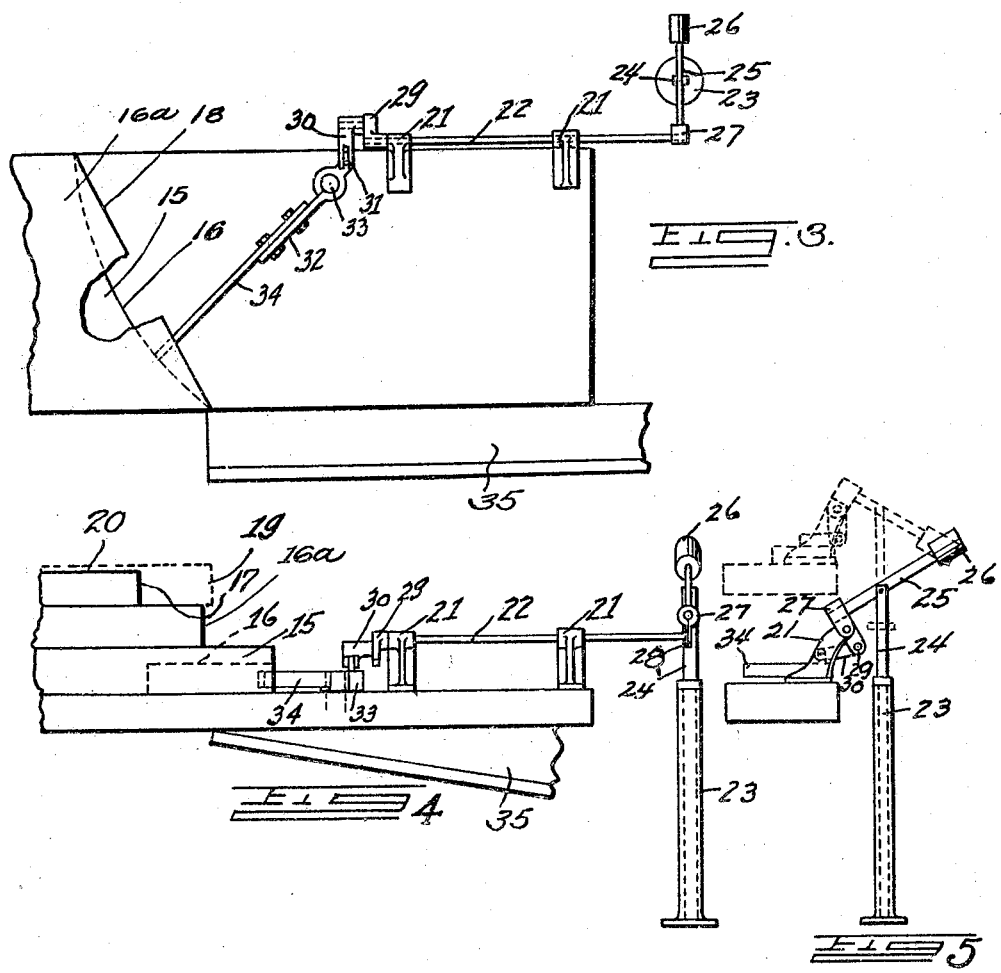
INVENTORS.
Carl F. Streit
George J. Kuchnle
BY
Allen Rell
ATTORNEYS.

Patented May 19, 1931

1,805,856

UNITED STATES PATENT OFFICE

CARL F. STREIT AND GEORGE J. KUEHNLE, OF CINCINNATI, OHIO; SAID KUEHNLE ASSIGNOR TO SAID STREIT

SCRAP REMOVING DEVICE FOR WOODWORKING MACHINERY

Application filed February 15, 1929. Serial No. 340,315.

Our invention relates to devices for removing scrap from woodworking and sawing machines, and to a particular development in this art in which a labor saving and safety device is incorporated in an attachment which may be associated with a woodworking machine.

The particular modification illustrative of our invention which we shall describe is in combination with a miter saw. In the art there has been developed a miter saw which has independently adjustable rotary saws which may be set at a desired angle and a desired distance apart. The work to be sawed is carried into engagement with the saws by a reciprocating work support or table. It has been customary for these machines to be controlled by a foot treadle upon which the operator steps when he desires to move the table, although the tables may, of course, be set for a constant operating speed. In miter sawing work the scraps have fallen on the table top and the operator, between strokes of the table, has inserted his hands under the blades and brushed the scrap away. This operation has not only slowed down the speed at which the operator could operate the machine, but it has also been a source of great danger, as the operator, in his effort to secure a maximum output from the machine, has often brushed out the end scrap pieces during the upward movement of the table, thereby taking considerable chance of injury from the saws.

It is the object of our invention to provide an attachment which may be associated with a miter sawing machine which will automatically brush away scrap from the table, thereby avoiding the necessity of the operator inserting his hands under the saws. It is further our object to provide a work supporting member having arcuate sides which will enable the scrap removing arms to brush the table clean. A further object is the incorporation of a scrap chute with the table which will automatically guide the end scraps into scrap boxes or otherwise dispose of it.

The above and other objects to which reference will be made in the ensuing disclosure we accomplish by that certain combination and arrangement of parts of which we have illustrated a preferred embodiment.

Referring to the drawings:—

Figure 1 is a perspective view of a miter saw equipped with our novel scrap removing safety attachment.

Figure 2 is a perspective view of parts of the mechanism disassociated from the miter saw, the particular rocker illustrated being adapted for use at the right end of the table.

Figure 3 is a plan view of the right end of a miter saw table equipped with our safety scrap remover.

Figure 4 is a front elevation of the parts shown in Figure 3.

Figure 5 is an end elevation of the parts shown in Figures 3 and 4.

The miter saw illustrated has a pair of motors 1 and 2 mounted on adjustable brackets 3 and 4 which will permit the rotation of the motors and the setting thereof a desired distance apart on a supporting base which is independent of the work table. The shafts of the motors carry the rotary saws 5 and 6. A flat table 7 is provided with vertical guide rods 8 and 9 which reciprocate in vertical bearings 10 and 11. The mechanism for elevating the table consists of the toggle links 12, 13 mounted on an oscillating shaft 14 which is driven by some suitable source of power, not shown. The mechanism thus far described is of one standard type of woodworking machine and forms no part of our invention, excepting in combination with the attachments hereinafter noted.

For holding work, the edges of which are to be cut off at a desired angle, we have built up on the table a work support having a bottom member 15 having arcuate sides 16 for a purpose which will be hereinafter described. On the bottom support we have mounted another supporting members 16a having straight sides 17 and 18 which project out over the arcuate sides of the underneath support. The work indicated in dotted lines at 19, to be cut, is placed on the upper surface of the support 16a with the edges to be cut off extending out over the sides 17 and 18 as indicated. There will also usually be provided a backing support 20 against which the inner surface of the work will abut. As the table reciprocates up and down the saws cut through the overhanging ends of the work and the end scrap falls on the table below.

For safely removing the scrap without delaying the operator of the machine, we have provided the attachment which forms the subject matter of our invention. Mounted on the table are a series of bearing brackets 21 through which the scrap arm remover operating shafts 22 extend. At the ends of the table there are tubular supports 23 in which rods 24 reciprocates. The rods are connected to rocking arms 25 having weights 26 at their free ends and slidably engaging bearing brackets 27 at their operating ends. The brackets 27 have bosses 28 in which the ends of the shafts 22 are fixed so that when the table moves up and down the rocker arms 25 rock and the shafts 22 are thereby rotated through a partial revolution clockwise and counterclockwise.

As a shaft 22 passes through the partial revolving stroke it operates crank arm 29 which through crank arm 30 is connected with a ball socket joint 31. The ball socket joint transmits the movement to an arm 32 pivoted in a vertical pivot as indicated at 33. Preferably adjustably mounted on the arm 32 is brushing arm 34 which, with each stroke of the bed, wipes the area of the table lying under the ends of the work that are to be cut off.

At the extreme outward position of the wiping arms there may be mounted inclined slides 35 down which the scrap will slide into any suitable scrap receptacle. Without the undercutting of the lower work support being of arcuate shape, it will be apparent that the wiping arm could not cover the entire area on which scrap would be likely to fall, and if there was any unwiped surface on the table an operator might be tempted to insert his hands to remove the scrap.

The device for actuating the wiping arms may be constructed in many different ways, but insofar as mechanical adaptations employ the inventive principle involved, we consider such modifications within the scope of our invention.

Having thus described our invention, what we claim as new and desire to secure by Letters Patent, is:—

1. In combination with a woodworking machine having a reciprocating table and woodworking tools into engagement with which said table carries work, a scrap removing attachment comprising arms, and means for mounting them so that they may be movable through sectors of a circle over the table in the areas thereof on which scrap is likely to fall.

2. In combination with a woodworking machine having a reciprocating table and woodworking tools into engagement with which said table carries work, a scrap removing attachment comprising arms movable through sectors of a circle over the table in the areas thereof on which scrap is likely to fall, and means operative incident to operation of said woodworking machine for actuating said arms in their movement.

3. In combination with a woodworking machine having a reciprocating table and woodworking tools into engagement with which said table carries work, a scrap removing attachment comprising arms movable through sectors of a circle over the table in the areas thereof on which scrap is likely to fall, and means operative incident to reciprocation of said table for actuating said arms in their movement, said means comprising a tubular retainer, a shaft oscillatable therein, and a rocker arm.

4. In combination with a sawing machine having a reciprocating table on which scraps of cut-off portions of work fall, means for wiping said scraps from said table, said means comprising pivoted wiping arms having extended ends movable through sectors over the surface of the table, and means operative incident to operation of said machine for actuating said wiping arms.

5. In combination with a sawing machine having a reciprocating table on which scraps of cut-off portions of work fall, means for wiping said scraps from said table, said means comprising pivoted wiping arms having extended ends movable through sectors over the surface of the table, and means for actuating said wiping arms comprising a shaft carried on the table and a rocker element having a pivot on which it is movable in a plane parallel with the plane of movement of said table, having a connection with said shaft.

6. In combination with a sawing machine having a reciprocating table on which scraps of cut-off portions of work fall, means for wiping said scraps from said table, said means comprising pivoted wiping arms having extended ends movable through sectors over the surface of the table, and means for actuating said wiping arms, said means controlled by the movement of said table.

7. In combination with a woodworking machine having a reciprocating table and woodworking tools into engagement with which said table carries work, a scrap removing attachment comprising arms movable through sectors of a circle over the table in the areas thereof on which scrap is likely to fall, said table having a work support with undercut arcuate sides the curve of which the ends of said arms follow in their wiping movement.

8. In combination with a sawing machine having a reciprocating table on which scraps of cut-off portions of work fall, means for wiping said scraps from said table, said means comprising pivoted wiping arms having extended ends movable through sectors over the surface of the table, said table having a work support with undercut sides corresponding to the arcs which the ends of the wiping arms describe.

9. In combination with a sawing machine having a reciprocating table on which cut-off portions of scrap fall, a pivoted wiping arm movable through a sector over the surface of the table.

10. In combination with a sawing machine having a reciprocating table on which cut-off portions of scrap fall, a pivoted wiping arm movable through a sector over the surface of the table, said table having a work support with an undercut portion corresponding to the arc which the end of said arm describes.

11. In combination with a machine having a tool and a feeding member for feeding work to said tool, the operation of said tool producing scrap which falls onto said feeding member, a scrap-removing element extending its length across the scrap-receiving surface of said feeding member, and means for moving said element laterally across said surface.

12. In combination with a machine having a tool and a feeding member for feeding work to said tool, the operation of said tool producing scrap which falls onto said feeding member, a scrap-removing element carried by said feeding member and extending across the scrap-receiving surface of said feeding member, a support relative to which said feeding member moves, and an operative connection from said scrap-removing element to said support whereby said element is moved across said surface incident to movement of said feeding member.

13. In combination with a machine having a tool and a feeding member for feeding work to said tool, the operation of said tool producing scrap which falls onto said feeding member, a scrap-removing element carried by said feeding member and extending across the scrap-receiving surface of said feeding member, a shaft journaled on said feeding member, a support relative to which said feeding member moves, and operative connections from said shaft to said scrap-removing element and said support, respectively, whereby said element is moved across said surface incident to movement of said feeding member.

14. In combination with a machine having a tool and a feeding member for feeding work to said tool, the operation of said tool producing scrap which falls onto said feeding member, a work support on said feeding member having a part overhanging the scrap-receiving surface of said feeding member, a scrap-removing element extending across said scrap-receiving surface and having a movement across said surface whereby it passes under said overhanging part of said work support, and means for moving said element across said surface.

15. In combination with a machine having a tool and a feeding member for feeding work to said tool, the operation of said tool producing scrap which falls onto said feeding member, a scrap-removing attachment for said machine comprising a scrap-removing element carried by said feeding member, and operating means for said element mounted partly on said feeding member and partly on a surface extraneous to said machine, the operation of said element being effected incident to the movement of said feeding member relative to said extraneous surface.

CARL F. STREIT.
GEORGE J. KUEHNLE.